Sept. 18, 1951 F. L. ADELSON 2,568,677

TUBE RACK FOR QUALITATIVE CHEMICAL ANALYSIS

Filed May 17, 1948

INVENTOR.
FRED L. ADELSON
BY
Wm. H. Dean
AGENT

Patented Sept. 18, 1951

2,568,677

UNITED STATES PATENT OFFICE 2,568,677

TUBE RACK FOR QUALITATIVE CHEMICAL ANALYSIS

Fred L. Adelson, San Diego, Calif.

Application May 17, 1948, Serial No. 27,488

2 Claims. (Cl. 211—72)

1

My invention relates to a tube rack for qualitative chemical analysis, and the objects of my invention are:

First, to provide a rack of this class having a master plate on the upper side thereof provided with designated openings therein in which tubes may be positioned in accordance with said designations relating to certain steps taken in continuity with each other for completing an analysis by chemical reaction of certain materials.

Second, to provide a rack of this class which is particularly adapted for use in holding tubes in upright position and affording a view of the contents in the tubes to the operator thereof.

Third, to provide a rack of this class which employs a master plate and an indexing plate wherein a plurality of holes in the indexing plate coincide vertically with various holes in several of the master plates which may be superimposed over the indexing plate during various analysis operations performed in accordance with the master plate.

Fourth, to provide a rack of this class having novel base structure including an abutment plate for the lower ends of tubes placed in the rack and vertical plate portions for holding opposite ends of spaced superimposed indexing and master plates in unitary arrangement.

Fifth, to provide a rack of this class which may be made of a variety of materials easily fabricated, reducing to a minimum, the cost of production of said rack.

Sixth, to provide a rack of this class which may be collapsed in flat form, and which may be conveniently carried between the leaves of a textbook or the like, if desired, and Seventh, to provide a rack of this class which is very simple and economical of construction, efficient in operation and which will not deteriorate or get out of order.

Figure 1:
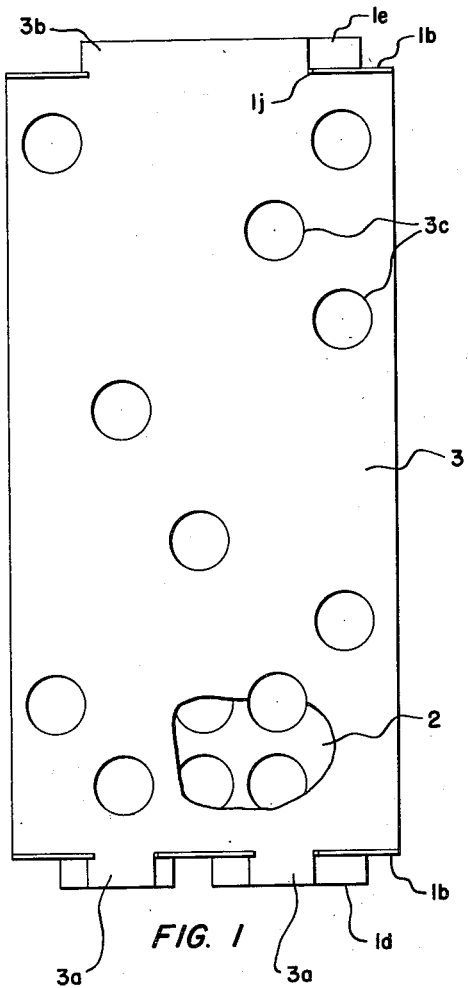
Figure 3:
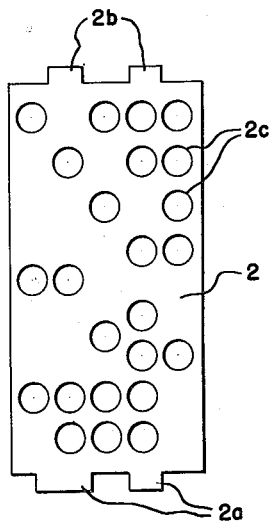
Figure 4:
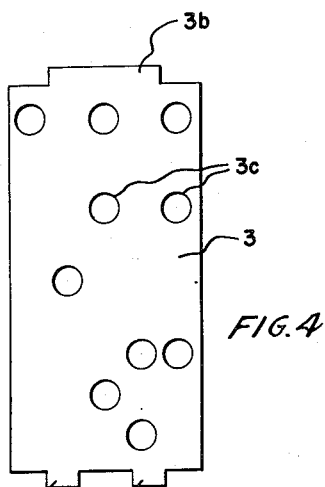
Figures 2, 5:
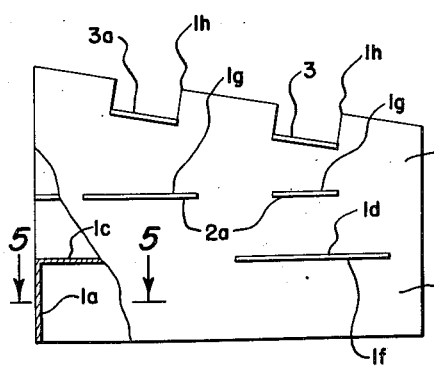
Figure 6:
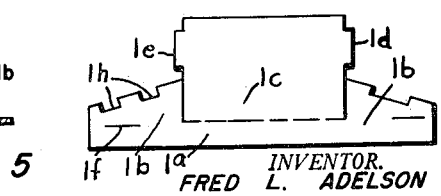

With these and other objects in view, as will appear hereinafter, my invention consists of certain novel features of construction, combination and arrangement of parts and portions as will be hereinafter described in detail and particularly set forth in the appended claims; reference being had to the acompanying drawings and to the characters of reference thereon forming a part of this application in which:

Figure 1 is a top or plan view of my tube rack for qualitative chemical analysis showing a portion thereof broken away to amplify the illustration, Figure 2 is an end view thereof showing a portion broken away and in section to amplify the illustration. Figure 3 is a reduced plan view of the indexing plate of my tube rack, Figure 4 is a reduced top or plan view of one of the master plates of my tube rack, and Figure 5 is a fragmentary plan sectional view taken from the line 5—5 of Figure 2 showing the corner construction of the base of my tube rack and Fig. 6 is a side elevational view of the base of my tube rack shown in flat form, illustratnig by a dash line a second bending portion.

Similar characters of reference refer to similar parts and portions throughout the several views of the drawings.

The base 1, indexing plate, 2, and the master plate 3 constitute the principal parts and portions of my tube rack for qualitative chemical analysis.

The base 1, as shown in Figures 1, 2 and 5 is made of one piece of material, opposite ends of this base 1 are folded at right angles as shown in Figure 5 of the drawings wherein the back portion 1a of the base 1 is integral with the end plate portion 1b and each opposite end of the base 1 is provided with one of these end plate portions 1b, as shown best in Figure 1 of the drawings. Folded at right angles to the back plate portion 1a on a horizontal plane is the tube abutment plate portion 1c provided with extending tabs 1d and 1e projected through slotted portions 1f in the end plates 1b, all as shown best in Figures 1 and 2 of the drawings. It will be noted that the end plates 1b integral with the rear plate portion 1a, interlocked with the horizontally disposed tube abutment plate portion 1c provide a very substantial rigid structure in proportion to the materials used. The end plate portions 1b of the base 1 are provided with additional slotted portions 1g in which the projecting tabs 2a of the indexing plates 2 are positioned, the opposite end of the indexing plates 2 is provided with similar tabs 2b extending through similar slotted portions in the opposite end plate portion 1b of the base 1. It will be noted that the tabs 2a and 2b are of different lengths, so that reversal of the indexing plate to the base 1 is prevented by uniformity of the notches 1h in which the projecting tabs 3a of the master plate 3 are positioned. A single tab 3b at the opposite end of the master plate 3 is positioned in a notch portion 1j so that reversal of the master plate relative to the base 1 is impossible during the assembly of the master plate 3 with the base 1. It will be noted that the indexing plate 2 is provided with a greater number of holes therein designated 2c than the number of holes 3c in the master plate 3, making possible the interchange of different master plates 3 without changing the indexing plates 2, thus the openings 2c in the indexing plates 2 are arranged to accommodate or align with different sets of holes in different master plates 3, which dictate the continuity of procedure in following different steps involved in the chemical analysis of certain materials.

The operation of my tube rack for qualitative chemical analysis is substantially as follows:

The master plate 3 is provided with designations adjacent the holes 3c indicating steps taken in continuity to each other in the chemical analysis of certain materials, for example, tubes may be consecutively placed in the different holes 3c as each new step occurs in the analysis process involved. As the tubes are placed in the holes 3c, they pass through certain of the holes 2c in the indexing plate 2 so that the tubes are maintained in vertical alignment and upright position wherein full view of the materials therein may be had intermediate the abutment plate 1c, indexing plate 2, and master plate 3. It will be noted that the lower ends of the tubes which are projected through the master plate 3 and indexing plate 2 are supported on the abutment plate portion 1c of the base 1. The material used in the construction of the base 1, indexing plate 2, and master plate 3 is preferably impervious to various chemicals being used in the particular analysis designated on the master plate 3. When it is desired to transport or ship my tube rack in flat form, the end tabs of the master plate 3, indexing plate 2, and abutment plate portion 1c of the base 1, are removed from the slotted portions in the end plate portions 1b of the base 1, then the ends 1b and abutment plate portions 1c are pivoted substantially ninety degrees to coincide with the plane of the rear plate portion 1a of the base 1, or the end plate portions 1b may be folded into flat relationship with the rear plate portions 1a, and abutment plate portions 1c when aligned with each other. The reverse procedure may be followed in assemblying my tube rack in the connected arrangement as shown in Figures 1 and 2 of the drawings, so that the rack may be placed on the horizontal surface and the plane of the master plate 3 is slightly inclined toward the normally open side of the rack, as shown in Figure 2 of the drawings, permitting a clear view of the designations adjacent the holes 3c in the master plate 3 from the low angle or acute angle to the horizontal, greatly facilitating the view of a person sitting at a desk on which the tube rack is positioned.

Though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In a tube rack of the class described, the combination of a base having an integral foldable tube abutment plate, and integral folded end plates, said end plates provided with slotted portions therein adapted to receive projecting tabs of said abutment plate, said end plates having slotted portions therein spaced above said first mentioned slotted portions and an indexing plate having projecting tabs fitted in said second mentioned slotted portions, open notched portions in the upper edge of said end plates, and a master plate provided with a plurality of tube-receiving openings therein having projecting tabs readily removably connected with said notched portions.

2. In a tube rack of the class described, the combination of a base having an integral foldable tube abutment plate, and integral folded end plates, said end plates provided with slotted portions therein adapted to receive projecting tabs of said abutment plate, said end plates having slotted portions therein spaced above said first mentioned slotted portions and an indexing plate having projecting tabs fitted in said second mentioned slotted portions, open notched portions in the upper edge of said end plates, and a master plate provided with a plurality of tube-receiving openings therein having projecting tabs readily removably connected with said notched portions, the tabs on opposite ends of said master plate, and said indexing plate, respectively, being of different sizes, preventing the reversal of said master plate and said indexing plate relative to said base when assembling the same with said base.

FRED L. ADELSON.

REFERENCES CITED

The following references are of record in the file of this patent:

UNITED STATES PATENTS

| Number | Name | Date |
|---|---|---|
| 1,296,158 | Bonham | Mar. 4, 1919 |
| 1,821,313 | Marsh | Sept. 1, 1931 |
| 1,836,138 | Turner et al. | Dec. 15, 1931 |
| 1,902,566 | Marsh | Mar. 21, 1933 |
| 1,948,902 | Carmichael | Feb. 27, 1934 |
| 1,965,032 | Davey | July 3, 1934 |
| 1,966,734 | Rosen | July 17, 1934 |

FOREIGN PATENTS

| Number | Country | Date |
|---|---|---|
| 646,001 | France | July 9, 1928 |